(12) United States Patent
Cui et al.

(10) Patent No.: US 11,033,987 B2
(45) Date of Patent: Jun. 15, 2021

(54) HYBRID ARTICLE, METHOD FOR FORMING HYBRID ARTICLE AND METHOD FOR WELDING

(71) Applicant: GENERAL ELECTRIC COMPANY, Schenectady, NY (US)

(72) Inventors: Yan Cui, Greer, SC (US); Srikanth Chandrudu Kottilingam, Greenville, SC (US); Matthew J. Laylock, Mauldin, SC (US); Brian Lee Tollison, Honea Path, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 553 days.

(21) Appl. No.: 15/472,693

(22) Filed: Mar. 29, 2017

(65) Prior Publication Data
US 2018/0281124 A1     Oct. 4, 2018

(51) Int. Cl.
*B23K 35/02*     (2006.01)
*C22C 19/07*     (2006.01)
(Continued)

(52) U.S. Cl.
CPC ............. *B23K 35/02* (2013.01); *B22F 3/10* (2013.01); *B22F 5/12* (2013.01); *B22F 7/04* (2013.01); *B23K 9/167* (2013.01); *B23K 9/23* (2013.01); *B23K 15/0006* (2013.01); *B23K 15/0093* (2013.01); *B23K 26/0006* (2013.01); *B23K 35/025* (2013.01); *B23K 35/0272* (2013.01);
(Continued)

(58) Field of Classification Search
None
See application file for complete search history.

(56) References Cited

U.S. PATENT DOCUMENTS

| | | |
|---|---|---|
| 3,989,863 A | 11/1976 | Jackson et al. |
| 5,569,546 A | 10/1996 | Ferrigno et al. |
| (Continued) | | |

FOREIGN PATENT DOCUMENTS

WO     2014063222 A1     5/2014

OTHER PUBLICATIONS

"Wire gauge size chart", <https://www.rapidtables.com/calc/wire/wire-gauge-chart.html#chart>, accessed Feb. 27, 2020.*
(Continued)

*Primary Examiner* — Xiaobei Wang
(74) *Attorney, Agent, or Firm* — McNees Wallace & Nurick LLC

(57) ABSTRACT

A hybrid article is disclosed including a sintered coating disposed on and circumscribing the lateral surface of a core having a core material and a greater density than the sintered coating. The sintered coating includes more than about 95% up to about 99.5% of a first metallic particulate material including a first melting point, and from about 0.5% up to about 5% of a second metallic particulate material having a second melting point lower than the first melting point. A method for forming the hybrid article is disclosed including disposing the core in a die, introducing a slurry having the metallic particulate materials into a gap between the lateral surface and the die, and sintering the slurry. A method for welding a workpiece is disclosed including the hybrid article serving as a weld filler.

21 Claims, 2 Drawing Sheets

(51) Int. Cl.
    *C22C 19/00* (2006.01)
    *B23K 35/30* (2006.01)
    *C22C 19/05* (2006.01)
    *B23K 35/40* (2006.01)
    *B32B 15/01* (2006.01)
    *B22F 3/10* (2006.01)
    *B22F 5/12* (2006.01)
    *B22F 7/04* (2006.01)
    *B23K 9/167* (2006.01)
    *B23K 9/23* (2006.01)
    *B23K 15/00* (2006.01)
    *B23K 26/00* (2014.01)
    *C23C 24/08* (2006.01)
    *B22F 7/06* (2006.01)

(52) U.S. Cl.
    CPC .......... *B23K 35/30* (2013.01); *B23K 35/3033* (2013.01); *B23K 35/3046* (2013.01); *B23K 35/3053* (2013.01); *B23K 35/404* (2013.01); *B32B 15/01* (2013.01); *C22C 19/007* (2013.01); *C22C 19/05* (2013.01); *C22C 19/055* (2013.01); *C22C 19/056* (2013.01); *C22C 19/057* (2013.01); *C22C 19/07* (2013.01); *C23C 24/087* (2013.01); *B22F 2007/047* (2013.01); *B22F 2007/068* (2013.01); *B22F 2998/10* (2013.01); *Y10T 428/12042* (2015.01)

(56) References Cited

U.S. PATENT DOCUMENTS

| | | | |
|---|---|---|---|
| 9,862,046 B2 * | 1/2018 | Cui | B23K 1/0018 |
| 10,035,329 B2 * | 7/2018 | Cui | B22F 5/04 |
| 10,265,792 B2 * | 4/2019 | Cui | F01D 5/147 |
| 2004/0222206 A1 | 11/2004 | Takashi et al. | |
| 2013/0086785 A1 | 4/2013 | Yan et al. | |

OTHER PUBLICATIONS

Cui, et al.; "Hybrid Article, Method for Forming Hybrid Article and Method for Closing Aperture", filed on Dec. 11, 2015 as U.S. Appl. No. 14/966,788 (not yet published).

Extended European Search Report for counterpart European Patent Application No. 18162547.6 by the EPO dated Aug. 17, 2018.

* cited by examiner

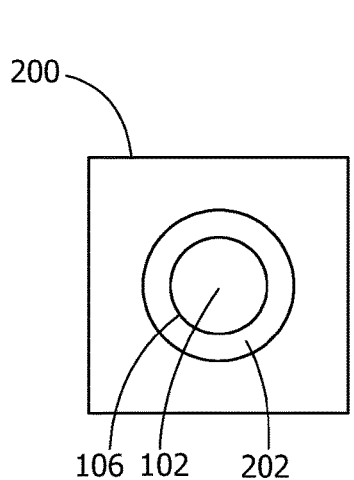
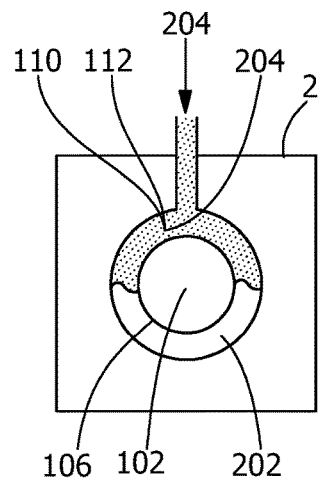
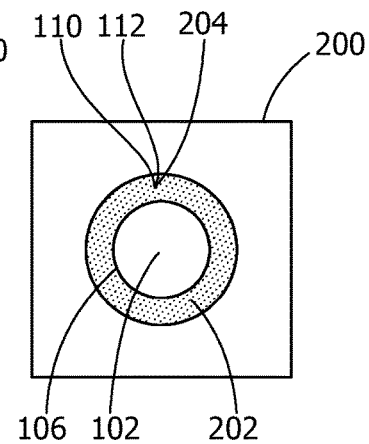
FIG. 3　　FIG. 4　　FIG. 5
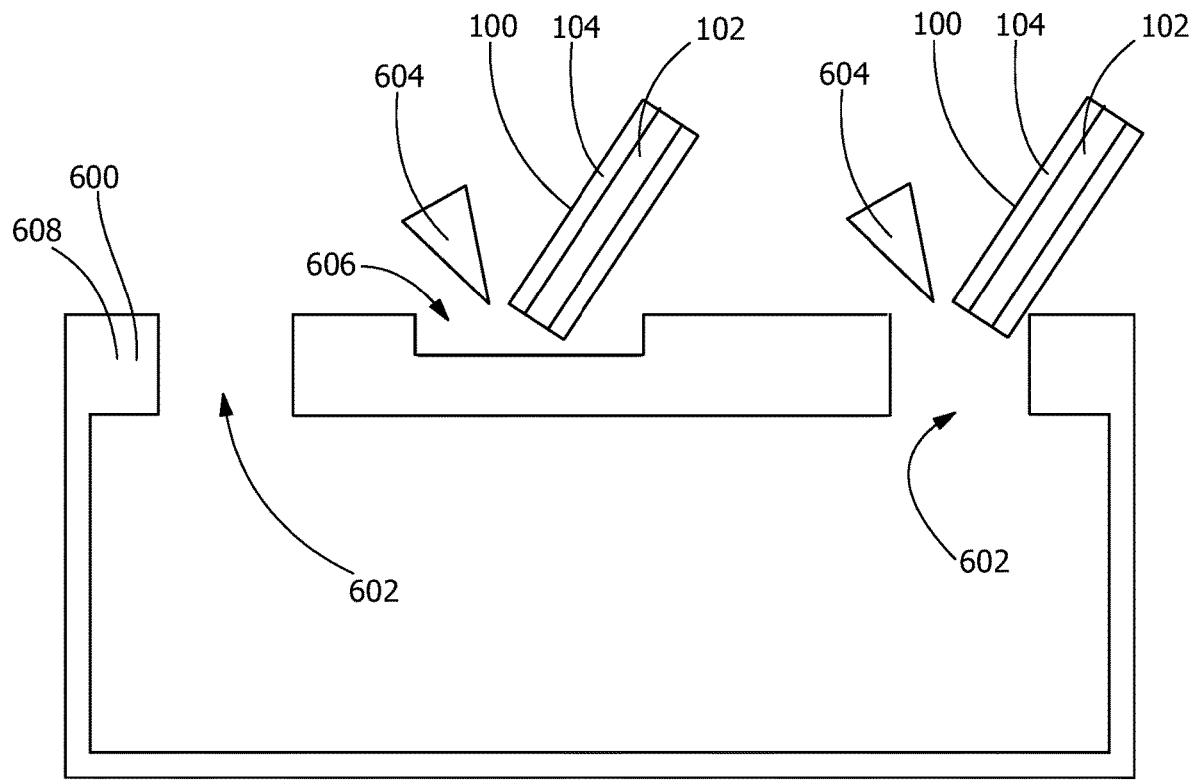
FIG. 6

HYBRID ARTICLE, METHOD FOR FORMING HYBRID ARTICLE AND METHOD FOR WELDING

FIELD OF THE INVENTION

The present invention is directed to hybrid articles, methods for forming hybrid articles and methods for welding. More particularly, the present invention is directed to hybrid articles, methods for forming hybrid articles and methods for welding wherein the hybrid articles include a core material and a coating having two metallic particulate materials with different melting points.

BACKGROUND OF THE INVENTION

Hard-to-weld (HTW) alloys, such as nickel-based superalloys and certain aluminum-titanium alloys, due to their gamma prime and various geometric constraints, are susceptible to gamma prime strain aging, liquation and hot cracking. These materials are also difficult to join when the gamma prime phase is present in volume fractions greater than about 30%, which may occur when aluminum or titanium content exceeds about 3%. As used herein, an "HTW alloy" is an alloy which exhibits liquation, hot and strain-age cracking, and which is therefore impractical to weld.

These HTW alloys may be incorporated into components of gas turbine engines such as airfoils, blades (buckets), nozzles (vanes), shrouds, combustors, rotating turbine components, wheels, seals, 3d-manufactured components with HTW alloys and other hot gas path components. Incorporation of these HTW alloys may be desirable due to often superior operational properties, particularly for certain components subjected to the most extreme conditions and stresses.

Manufacturing processes and repairs of components incorporating HTW alloys, such as the closing of apertures left open during casting processes, are difficult to perform using standard techniques such as fusion welding processes, as fusion welding processes may damage the HTW alloys or introduce materials which would be weakened or cracked by the elevated temperatures to which the components are subjected to.

BRIEF DESCRIPTION OF THE INVENTION

In an exemplary embodiment, a hybrid article includes a core and a sintered coating. The core includes a lateral surface and a core material. The sintered coating is disposed on and circumscribes the lateral surface. The sintered coating includes a first metallic particulate having a first melting point and a second metallic particulate material having a second melting point lower than the first melting point. The first metallic particulate material constitutes, by weight, more than about 95% up to about 99.5% of the sintered coating, and the second metallic particulate material constitutes, by weight, from about 0.5% up to about 5% of the sintered coating. The sintered coating includes a coating density less than the core.

In another exemplary embodiment, a method for forming a hybrid article includes disposing a core in a die. The core includes a lateral surface. A gap is formed between the lateral surface and the die. The gap circumscribes the lateral surface. A slurry including a metallic powder and a binder gel is introduced into the gap. The metallic powder includes a first metallic particulate material having a first melting point, and a second metallic particulate material having a second melting point. The second melting point is lower than the first melting point. The first metallic particulate material constitutes, by weight, more than about 95% up to about 99.5% of the metallic powder, and the second metallic particulate material constitutes, by weight, from about 0.5% up to about 5% of the metallic powder. The lateral surface is coated with the slurry. The slurry is sintered to form a sintered coating circumscribing the lateral surface, forming the hybrid article. The sintered coating includes a coating density less than the core.

In another exemplary embodiment, a method for welding a workpiece includes welding the workpiece with a hybrid article serving as a weld filler. The hybrid article includes a core and a sintered coating. The core includes a lateral surface and a core material. The sintered coating is disposed on and circumscribes the lateral surface. The sintered coating includes a first metallic particulate having a first melting point and a second metallic particulate material having a second melting point lower than the first melting point. The first metallic particulate material constitutes, by weight, more than about 95% up to about 99.5% of the sintered coating, and the second metallic particulate material constitutes, by weight, from about 0.5% up to about 5% of the sintered coating. The sintered coating includes a coating density less than the core.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 3 is a sectional view along lines 3-3 of the core and die of FIG. 2, according to an embodiment of the present disclosure.

FIG. 4 is a sectional view along lines 4-4 of the core, die, and slurry of FIG. 2, according to an embodiment of the present disclosure.

FIG. 5 is a sectional view along lines 5-5 of the core, die, and slurry of FIG. 2, according to an embodiment of the present disclosure.

FIG. 6 is a sectional view of a workpiece and hybrid articles, according to an embodiment of the present disclosure.

Wherever possible, the same reference numbers will be used throughout the drawings to represent the same parts.

DETAILED DESCRIPTION OF THE INVENTION

Provided are exemplary hybrid articles, methods for forming hybrid articles and methods for welding workpieces. Embodiments of the present disclosure, in comparison to articles and methods not utilizing one or more features disclosed herein, decrease costs, increase process control, increase reparability, improve mechanical properties, improve elevated temperature performance, increase weldability, or combinations thereof.

Figure 1:
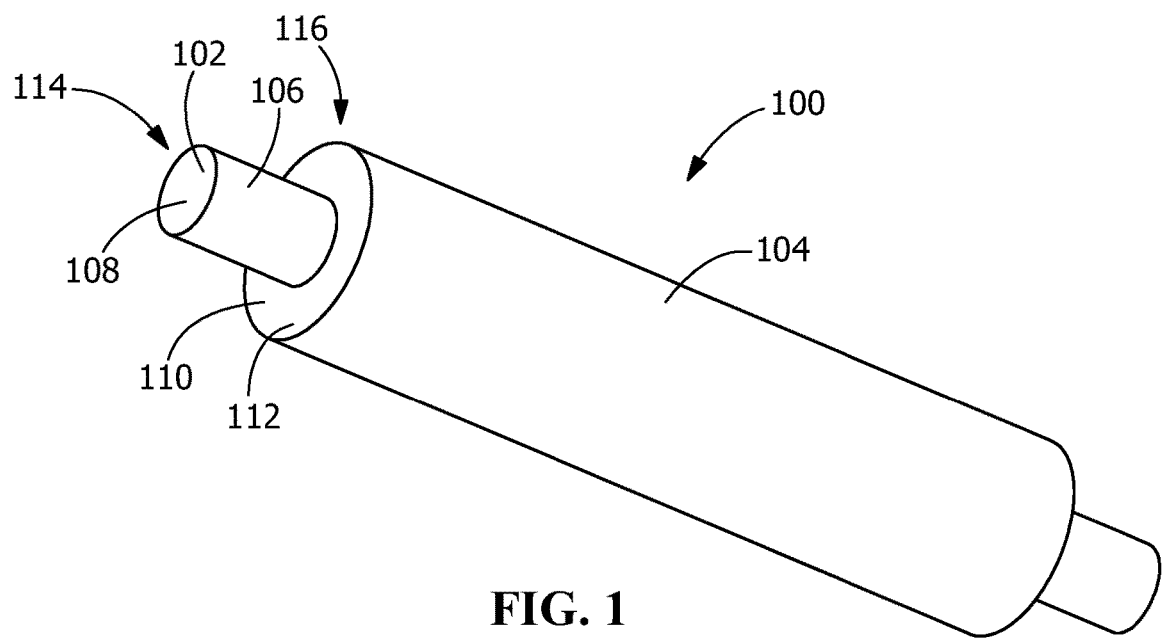
FIG. 1 is a perspective view of a hybrid article, according to an embodiment of the present disclosure.

Referring to FIG. 1, in one embodiment, a hybrid article 100 includes a core 102 and a sintered coating 104. The core 102 includes a lateral surface 106 and a core material 108. The sintered coating 104 is disposed on the lateral surface 106. The sintered coating 104 includes a first metallic particulate material 110 and a second metallic particulate material 112. The sintered coating 104 includes a coating density less than the core 102. In a further embodiment, the hybrid article 100 is a weld filler for a fusion welding process.

In one embodiment, the core 102 includes an average diameter of from about 0.5 mm to about 3.5 mm, alternatively from about 0.7 mm to about 3.2 mm, alternatively from about 0.7 mm to about 1.7 mm, alternatively from about 1.2 mm to about 2.2 mm, alternatively from about 1.7 mm to about 2.7 mm, alternatively from about 2.2 mm to about 3.2 mm, alternatively from about 0.5 mm to about 1 mm, alternatively from about 0.75 mm to about 1.25 mm, alternatively from about 1 mm to about 1.5 mm, alternatively from about 1.25 mm to about 1.75 mm, alternatively from about 1.5 mm to about 2 mm, alternatively from about 1.75 mm to about 2.25 mm, alternatively from about 2 mm to about 2.5 mm, alternatively from about 2.25 mm to about 2.75 mm, alternatively from about 2.5 mm to about 3 mm, alternatively from about 2.75 mm to about 3.25 mm, alternatively from about 3 mm to about 3.5 mm.

In another embodiment, the sintered coating 104 includes an average coating thickness of from about 0.1 mm to about 10 mm, alternatively from about 0.25 mm to about 7.5 mm, alternatively from about 0.5 mm to about 5 mm, alternatively from about 0.25 mm to about 0.75 mm, alternatively from about 0.5 mm to about 1 mm, alternatively from about 0.75 mm to about 1.25 mm, alternatively from about 1 mm to about 1.5 mm, alternatively from about 1.25 mm to about 1.75 mm, alternatively from about 1.5 mm to about 2 mm, alternatively from about 1.75 mm to about 2.25 mm, alternatively from about 2 mm to about 2.5 mm, alternatively from about 2.25 mm to about 2.75 mm, alternatively from about 2.5 mm to about 3 mm, alternatively from about 2.75 mm to about 3.25 mm, alternatively from about 3 mm to about 3.5 mm, alternatively from about 3.25 mm to about 3.75 mm, alternatively from about 3.5 mm to about 4 mm, alternatively from about 3.75 mm to about 4.25 mm, alternatively from about 4 mm to about 4.5 mm, alternatively from about 4.25 mm to about 4.75 mm, alternatively from about 4.5 mm to about 5 mm, alternatively from about 4.75 mm to about 5.25 mm.

The hybrid article 100 may include any suitable article cross-sectional conformation 114, including, but not limited to, a circle (shown), an ellipse, an oval, a triangle, a rounded triangle, a square, a rounded square, a rectangle, a rounded rectangle, a pentagon, a rounded pentagon, a hexagon, a rounded hexagon, or a combination thereof. The core 102 may include any suitable core cross-sectional conformation 116, including, but not limited to, a circle (shown), an ellipse, an oval, a triangle, a rounded triangle, a square, a rounded square, a rectangle, a rounded rectangle, a pentagon, a rounded pentagon, a hexagon, a rounded hexagon, or a combination thereof. The article cross-sectional conformation 114 may be the same conformation as the core cross-sectional conformation 116 or a different conformation. In one embodiment, the core is a wire. In a further embodiment, the core is an electrically conductive wire.

The sintered coating 104 may include any suitable amount of the first metallic particulate material 110 and the second metallic particulate material 112. In one embodiment, the first metallic particulate material 110 constitutes, by weight, more than about 95% up to about 99.5% of the sintered coating 104, alternatively from about 96% up to about 99.5%, alternatively from about 96.5% up to about 99.5%, alternatively from about 97% up to about 99.5%, alternatively from about 97.5% up to about 99.5%. As used herein, "more than about 95%" indicates greater than the largest inherent range of "about 95%", and is not inclusive of 95% or its inherent range as established by "about". In another embodiment, the second metallic particulate material 112 constitutes, by weight, from about 0.5% up to about 5% of the sintered coating 104, alternatively from about 0.5% up to about 4.5%, alternatively from about 0.5% up to about 4%, alternatively from about 0.5% up to about 3.5%, alternatively from about 0.5% up to about 3%. As used herein, "up to about 5%" indicates less than the smallest inherent range of "about 5%", and is not inclusive of 5% or its inherent range as established by "about". In a further embodiment, the sintered coating 104 consists essentially of the first metallic particulate material 110 and the second metallic particulate material 112, excluding melting point depressants constituting, by weight, between about 0.5% to about 5% of the hybrid article 100, carbon constituting, by weight, between about 0.01% to about 0.08% of the hybrid article 100, and impurities forming, by weight, less than about 3% of the sintered coating 104, alternatively less than about 2% of the sintered coating 104, alternatively less than about 1% of the sintered coating 104. In yet a further embodiment, the sintered coating 104 consists of the first metallic particulate material 110 and the second metallic particulate material 112.

In one embodiment, the sintered coating 104 includes a melting point depressant. The melting point depressant may constitute any suitable proportion, by weight, of the hybrid article 100, including, but not limited to, between about 0.25% to about 7.5%, alternatively between about 0.5% to about 5%, alternatively between about 1% to about 4%, alternatively between about 0.5% to about 1.5%, alternatively between about 2% to about 2%, alternatively between about 1.5% to about 2.5%, alternatively between about 2% to about 3%, alternatively between about 2.5% to about 3.5%, alternatively between about 3% to about 4%, alternatively between about 3.5% to about 4.5%, alternatively between about 4% to about 5%. The melting point depressant may include any suitable material, including, but not limited to, silicon, boron, zirconium, germanium, and combinations thereof.

In one embodiment, the sintered coating 104 includes carbon. The carbon may constitute any suitable proportion, by weight, of the hybrid article 100, including, but not limited to, between about 0.01% to about 0.08%, alternatively between about 0.01% to about 0.03%, alternatively between about 0.02% to about 0.04%, alternatively between about 0.03% to about 0.05%, alternatively between about 0.04% to about 0.06%, alternatively between about 0.05% to about 0.07%, alternatively between about 0.06% to about 0.08%, alternatively less than about 0.08%, alternatively less than about 0.05%, alternatively less than about 0.02%, alternatively, less than about 0.01%.

In one embodiment, the first metallic particulate material 110 includes a first melting point, and the second metallic particulate material 112 includes a second melting point, wherein the second melting point is lower than the first melting point. The first melting point may be from about 2,380° F. to about 2,700° F., alternatively from about 2,400° F. to about 2,600° F., alternatively from about 2,450° F. to about 2,550° F., alternatively from about 2,475° F. to about 2,525° F. The second melting point may be from about 1,400° F. to about 2,375° F., alternatively from about 1,450° F. to about 2,300° F., alternatively from about 1,500° F. to about 2,200° F., alternatively from about 1,550° F. to about 2,150° F., alternatively from about 1,600° F. to about 2,100° F.

The core material 108 and the first metallic particulate material 110 may, independently, be any suitable material, including, but not limited to, a steel alloy, a stainless steel alloy, a superalloy, a nickel-based superalloy, a cobalt-based superalloy, an iron-based superalloy, an HTW alloy, a refractory alloy, GTD 111, GTD 222, GTD 262, HASTELLOY W, HAYNES 188, HANES 230, HANES 282, INCONEL 617, INCONEL 625, INCONEL 718, INCONEL 738, MAR-M-247, NIMONIC 263, René 41, René 80, René 108, René 142, René 195, 316SS, or combinations thereof. The first metallic particulate material 110 may be the same material as the core material 108 or a different material.

The second metallic particulate material 112 may be any suitable material, including, but not limited to, a braze alloy, BCo-1, DF-4B, BNi-2, BNi-5, BNi-9, MAR-M-509B, or combinations thereof.

As used herein, "BCo-1" refers to an alloy including a composition, by weight, of about 19% chromium, about 17% nickel, about 0.8% boron, about 8% silicon, about 0.4% carbon, about 04% tungsten, and a balance of cobalt. BCo-1 is commercially available under that designation.

As used herein, "DF-4B" refers to an alloy including a composition, by weight, of about 14% chromium, about 10% cobalt, about 3.5% aluminum, about 2.5% tantalum, about 2.75% boron, about 0.05% yttrium, and a balance of nickel. DF-4B is commercially available under that designation.

As used herein, "BNi-2" refers to an alloy including a composition, by weight, of about 3% iron, about 3.1% boron, about 4.5% silicon, about 7% chromium, and a balance of nickel. BNi-2 is commercially available under that designation.

As used herein, "BNi-5" refers to an alloy including a composition, by weight, of about 10% silicon, about 19% chromium, and a balance of nickel. BNi-5 is commercially available under that designation.

As used herein, "BNi-9" refers to an alloy including a composition, by weight, of about 15% chromium, about 3% boron, and a balance of nickel. BNi-9 is commercially available under that designation.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel. GTD 111 is available from General Electric Company, 1 River Road, Schenectady, N.Y. 12345.

As used herein, "GTD 222" refers to an alloy including a composition, by weight, of about 23.5% chromium, about 19% cobalt, about 2% tungsten, about 0.8% niobium, about 2.3% titanium, about 1.2% aluminum, about 1% tantalum, about 0.25% silicon, about 0.1% manganese, and a balance of nickel. GTD 222 is available from General Electric Company, 1 River Road, Schenectady, N.Y. 12345.

As used herein, "GTD 262" refers to an alloy including a composition, by weight, of about 22.5% chromium, about 19% cobalt, about 2% tungsten, about 1.35% niobium, about 2.3% titanium, about 1.7% aluminum, about 0.1% carbon, and a balance of nickel. GTD 262 is available from General Electric Company, 1 River Road, Schenectady, N.Y. 12345.

As used herein, "HASTELLOY W" refers to an alloy including a composition, by weight, of about 5% chromium, about 6% iron, about 24% molybdenum, up to about 2.5% cobalt, up to about 1% tungsten, up to about 1% manganese, up to about 1% silicon, up to about 0.6% vanadium, up to about 0.12% carbon, and a balance of nickel. HASTELLOY W is available from Haynes International, 1020 W, Park Avenue, Kokomo, Ind. 46904.

As used herein, "HAYNES 188" refers to an alloy including a composition, by weight, of about 22% chromium, about 22% nickel, about 0.1% carbon, about 3% iron, about 1.25% manganese, about 0.35% silicon, about 14% tungsten, about 0.03% lanthanum, and a balance of cobalt. HAYNES 188 is available from Haynes International, 1020 W, Park Avenue, Kokomo, Ind. 46904.

As used herein, "HAYNES 230" refers to an alloy including a composition, by weight, of about 22% chromium, about 2% molybdenum, about 0.5% manganese, about 0.4% silicon, about 14% tungsten, about 0.3% aluminum, about 0.1% carbon, about 0.02% lanthanum, and a balance of nickel. HAYNES 230 is available from Haynes International, 1020 W, Park Avenue, Kokomo, Ind. 46904.

As used herein, "HAYNES 282" refers to an alloy including a composition, by weight, of about 20% chromium, about 10% cobalt, about 8.5% molybdenum, about 2.1% titanium, about 1.5% aluminum, about 0.06% carbon, about 0.005% boron, up to about 1.5% iron, and a balance of nickel. HAYNES 282 is available from Haynes International, 1020 W, Park Avenue, Kokomo, Ind. 46904.

As used herein, "INCONEL 617" refers to an alloy including a composition, by weight, of about 22% chromium, about 3% iron, about 12.5% cobalt, about 9% molybdenum, and a balance of nickel. INCONEL 617 is available from Special Metals Corporation, 3200 Riverside Drive, Huntington, W. Va. 25720.

As used herein, "INCONEL 625" refers to an alloy including a composition, by weight, of about 21.5% chromium, about 5% iron, about 9% molybdenum, about 3.65% niobium, about 1% cobalt, about 0.5% manganese, about 0.4% aluminum, about 0.4% titanium, about 0.5% silicon, about 0.1% carbon, and a balance of nickel. INCONEL 625 is available from Special Metals Corporation, 3200 Riverside Drive, Huntington, W. Va. 25720.

As used herein, "INCONEL 718" refers to an alloy including a composition, by weight, of about 19% chromium, about 18.5% iron, about 3% molybdenum, about 3.6% niobium and tantalum, and a balance of nickel. INCONEL 718 is available from Special Metals Corporation, 3200 Riverside Drive, Huntington, W. Va. 25720.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel. INCONEL 738 is available from Special Metals Corporation, 3200 Riverside Drive, Huntington, W. Va. 25720.

As used herein, "MAR-M-247" refers to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel. MAR-M-247 is commercially available under that designation.

As used herein, "MAR-M-509B" refers to an alloy including a composition, by weight, of about 23.5% chromium, about 10% nickel, about 7% tungsten, about 3.5% tantalum, about 0.45% zirconium, about 2.9% boron, about 0.6% carbon, about 0.2% titanium, and a balance of cobalt. MAR-M-509B is commercially available under that designation.

As used herein, "NIMONIC 263" refers to an alloy including a composition, by weight, of about 20% chromium, about 20% cobalt, about 6% molybdenum, about 2% titanium, about 0.5% aluminum, and a balance of nickel. NIMONIC 263 is available from Special Metals Corporation, 3200 Riverside Drive, Huntington, W. Va. 25720.

As used herein, "René 41" refers to an alloy including a composition, by weight, of about 19% chromium, about 11% cobalt, about 10% molybdenum, about 1.5% aluminum, about 3.1% titanium, and a balance of nickel. René 41 is commercially available under that designation.

Figure 2:
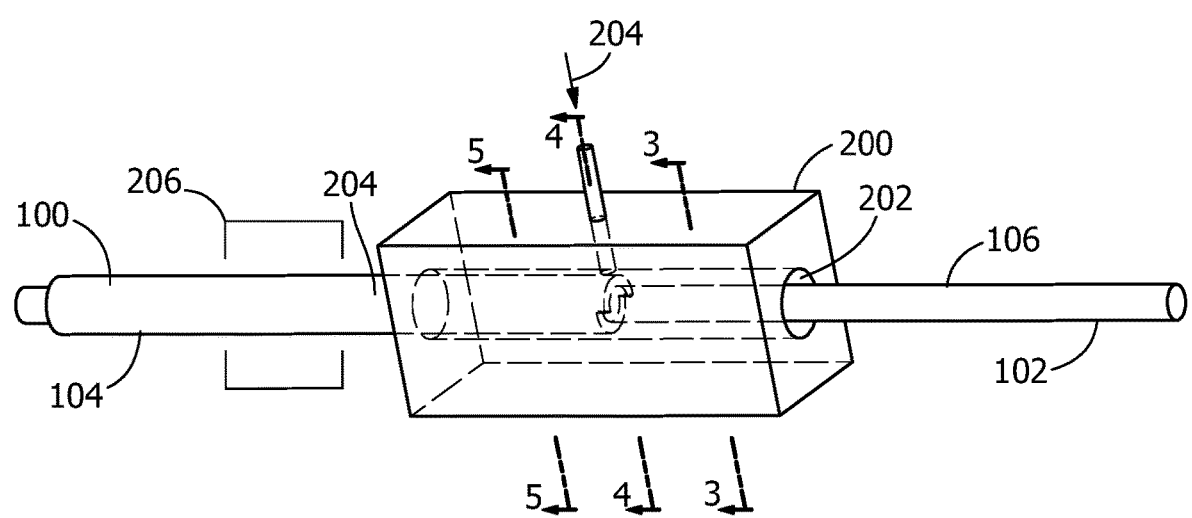
FIG. 2 is a schematic view of the formation of a hybrid article, according to an embodiment of the present disclosure.

As used herein, "René 80" refers to an alloy including a composition, by weight, of about 14% chromium, about 9.5% cobalt, about 4% molybdenum, about 3% aluminum, about 5% titanium, about 4% tungsten, about 0.17% carbon, and a balance of nickel. René 80 is commercially available under that designation As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel. René 108 is commercially available under that designation As used herein, "René 142" refers to an alloy including a composition, by weight, of about 6.8% chromium, about 12% cobalt, about 6.1% aluminum, about 4.9% tungsten, about 1.5% molybdenum, about 2.8% rhenium, about 6.4% tantalum, about 1.5% hafnium, and a balance of nickel. René 142 is commercially available under that designation As used herein, "René 195" refers to an alloy including a composition, by weight, of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel. René 195 is commercially available under that designation As used herein, "316SS" refers to an alloy including a composition, by weight, of about 17% chromium, about 12% nickel, about 2.5% molybdenum, and a balance of iron. 316SS is commercially available under that designation Referring to FIG. 2, in one embodiment, a method for forming the hybrid article 100, includes disposing the core 102 in a die 200. Referring to FIGS. 2 and 3, a gap 202 is formed between the lateral surface 106 and the die 200, and the gap 202 circumscribes the lateral surface 106. Referring to FIGS. 2 and 4, a slurry 204 including a metallic powder and a binder gel is introduced into the gap 202, the metallic powder including the first metallic particulate material 110 and the second metallic particulate material 112, and coating the lateral surface 106. Referring to FIGS. 2 and 5, the slurry 204 circumscribes the lateral surface 106. Referring again to FIG. 2, the slurry 204 is sintered to form the sintered coating 104 circumscribing the lateral surface 106, forming the hybrid article 100. In one embodiment, the slurry 204 includes a viscosity sufficient to adhere to the core 102 until the slurry 204 is sintered to form the sintered coating 104.

Sintering the slurry 204 to form the sintered coating 104 may include heating the slurry 204 with a heating element 206. The heating element 206 may be any suitable heating element, including, but not limited to, an oven. In one embodiment, heating the slurry 204 includes heating the slurry 204 to a sintering temperature. The sintering temperature may be any suitable temperature, including, but not limited to, a sintering temperature of from about 1,000° C. to about 1,350° C., alternatively from about 1,100° C. to about 1,250° C., alternatively from about 1,100° C. to about 1,200° C., alternatively from about 1,150° C. to about 1,250° C., alternatively from about 1,125° C. to about 1,225° C. In another embodiment, heating the slurry 204 to the sintering temperature includes maintaining the slurry 204 at the sintering temperature for a sintering duration. The sintering duration may be any suitable duration, including, but not limited to, a duration of from about 5 minutes to about 60 minutes, alternatively from about 10 minutes to about 40 minutes, alternatively from about 10 minutes to about 30 minutes, alternatively from about 20 minutes to about 40 minutes. Sintering the slurry 204 to form the sintered coating 104 may include heating the slurry 204 under air, under inert gas, under vacuum, or a combination thereof.

In one embodiment, the core 102 is a wire. In another embodiment, the core 102 is passed through the die 200. Passing the core 102 through the die 200 may be a continuous process. In yet another embodiment, the die 200 is part of a coating apparatus for the production of a welding electrode, such as, but not limited to, a shielded metal arc welding electrode. In another embodiment, the die 200 is a component of an extrusion press.

In one embodiment, the slurry 204 is introduced under elevated pressure. As used herein, "elevated pressure" indicates a pressure greater than atmospheric pressure external to the die 200. The elevated pressures may be any suitable pressure, including, but not limited to, a pressure sufficient to fully coat the lateral surface 106 with the slurry 204 as the core 102 passes through the die 200.

The hybrid article 100 may be finished by any suitable finishing technique, including, but not limited to, heating, polishing, brushing, tip cleaning, sizing, chemically treating, or a combination thereof. Sizing the hybrid article 100 may including removing at least one portion of the hybrid article 100 to reduce the length of the hybrid article 100 to a predetermined length. The predetermined length may be any suitable length. Removing at least one portion of the hybrid article 100 may include severing the at least one portion of the hybrid article 100 at any suitable angle with respect to the length of the hybrid article 100, including, but not limited to, an orthogonal angle or an angle matching the surface of an article into which the hybrid article 100 is to be inserted.

Referring to FIG. 6, in one embodiment, a method for welding a workpiece 600 includes welding the workpiece 600 with the hybrid article 100 servicing as a weld filler.

In one embodiment, welding the workpiece 600 includes closing an aperture 602 of the workpiece 600. Closing the aperture 602 may include inserting the hybrid article 100 into the aperture 602, and closing the aperture 602 by welding with the hybrid article 100 serving as the weld filler. Closing the aperture 602 may form a hermetic seal.

In another embodiment, welding the workpiece 600 includes cosmetic buildup repair of an undesirable feature 606 of the workpiece 600. Cosmetic buildup repair of the undesirable feature 606 of the workpiece 600 may include placing the hybrid article 100 adjacent to or into the undesirable feature 606, and repairing the undesirable feature 606 by welding with the hybrid article 100 serving as the weld filler.

In one embodiment, the workpiece 600 is a turbine component. The workpiece 600 may be any suitable turbine component, including, but not limited to, a hot gas path component, an airfoil, a bucket (also known as a blade), a shrouded bucket (also known as a shrouded blade), a nozzle (also known as a vane), a shroud, a combustor, or combinations thereof.

In one embodiment welding the workpiece 600 includes employing a welding apparatus 604 to perform a welding technique. The welding technique may be any suitable welding technique, including, but not limited to, fusion welding, gas tungsten arc welding, plasma arc welding, laser beam welding, electron beam welding, or combinations thereof.

The hybrid article 100 may be used as a weld filler for any suitable welding application which uses a welding technique incorporating a weld filler. Suitable welding applications include, but are not limited to, cosmetic buildup repair of superalloy components, cosmetic buildup repair of HTW alloy components, closing apertures in superalloy components, closing apertures in HTW alloy components, filling cavities in superalloy components, filling cavities in HTW alloy components, repairing superalloy components, repairing HTW alloy components, joining a first component and a second component, wherein at least one of the first component and the second component includes a superalloy, joining a first component and a second component, wherein at least one of the first component and the second component includes an HTW alloy, or a combination thereof. The welding technique may include, but is not limited to, fusion welding, gas metal arc welding, gas tungsten arc welding, plasma arc welding, laser beam welding, electron beam welding, or a combination thereof.

In one embodiment, the core material 108 of the hybrid article 100 includes the same material composition as a substrate material 608 of the workpiece 600 which defines the aperture 602. In another embodiment, the core material 108 of the hybrid article 100 includes a material composition distinct from the substrate material 608 of the workpiece 600 which defines the aperture 602. In this context, the core material 108 includes the same material composition as the substrate material 608 if the material composition is about the same and any variations are insufficient to have a material effect on the properties of the material, whereas the core material 108 of the hybrid article 100 includes a material composition distinct from the substrate material 608 if the material composition is not about the same or if the variations establish a material effect on the properties of the material.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hybrid article, comprising:
a core including a lateral surface and a core material, and
a sintered coating disposed on and circumscribing the lateral surface, the sintered coating including:
a first metallic particulate material including a first melting point and constituting, by weight, more than 96% up to about 99.5% of the sintered coating; and
a second metallic particulate material including a second melting point and constituting, by weight, from about 0.5% up to 4% of the sintered coating,
wherein the second melting point is lower than the first melting point and the sintered coating includes a coating density less than the core
wherein the hybrid article is a weld filler; and
wherein the core is a wire.

2. The hybrid article of claim 1, wherein the hybrid article is for a fusion welding process.

3. The hybrid article of claim 1, wherein the sintered coating includes a melting point depressant, and the melting point depressant constitutes, by weight, between about 0.5% to about 5% of the hybrid article.

4. The hybrid article of claim 1, further including carbon, wherein the carbon constitutes, by weight, between about 0.01% to about 0.08% of the hybrid article.

5. The hybrid article of claim 1, wherein the first metallic particulate material constitutes, by weight, from 97.0% up to about 99.5% of the sintered coating and the second metallic particulate material constitutes, by weight, from about 0.5% up to 3.0% of the sintered coating.

6. The hybrid article of claim 1, wherein the core material and the first metallic particulate material are independently selected from the group consisting of steel alloys, stainless steel alloys, superalloys, nickel-based superalloys, cobalt-based superalloys, iron-based superalloys, hard-to-weld (HTW) alloys, refractory alloys, GTD 111, GTD 222, GTD 262, HASTELLOY W, HAYNES 188, HANES 230, HANES 282, INCONEL 617, INCONEL 625, INCONEL 718, INCONEL 738, MAR-M-247, NIMONIC 263, Rene 41, Rene 80, Rene 108, Rene 142, Rene 195, 316SS, and combinations thereof.

7. The hybrid article of claim 1, wherein the second metallic particulate material is selected from the group consisting of braze alloys BCo-1, DF-4B, BNi-2, BNi-5, BNi-9, MAR-M-509B, and combinations thereof.

8. The hybrid article of claim 1, wherein the sintered coating further includes an average coating thickness of from about 0.5 mm to about 5 mm.

9. The hybrid article of claim 1, wherein the core further includes an average diameter of from about 0.7 mm to about 3.2 mm.

10. A method for forming a hybrid article, comprising:
disposing a core in a die, the core including a lateral surface;
forming a gap between the lateral surface and the die, the gap circumscribing the lateral surface;
introducing a slurry into the gap, the slurry including a metallic powder and a binder gel, the metallic powder including:
a first metallic particulate material including a first melting point and constituting, by weight, more than 96% up to about 99.5% of the metallic powder; and
a second metallic particulate material including a second melting point and constituting, by weight, from about 0.5% up to 4% of the metallic powder,
wherein the second melting point is lower than the first melting point;
coating the lateral surface with the slurry; and
sintering the slurry to form a sintered coating circumscribing the lateral surface, forming the hybrid article, the sintered coating including a coating density less than the core.

11. The method of claim 10, wherein disposing the core in the die and introducing the slurry include the core material and the first metallic particulate material being independently selected from the group consisting of steel alloys, stainless steel alloys, superalloys, nickel-based superalloys, cobalt-based superalloys, iron-based superalloys, hard-to-weld (HTW) alloys, refractory alloys, GTD 111, GTD 222, GTD 262, HASTELLOY W, HAYNES 188, HANES 230, HANES 282, INCONEL 617, INCONEL 625, INCONEL 718, INCONEL 738, MAR-M-247, NIMONIC 263, Rene 41, Rene 80, Rene 108, Rene 142, Rene 195, 316SS, and combinations thereof, and the second metallic particulate material being selected from the group consisting of braze alloys BCo-1, DF-4B, BNi-2, BNi-5, BNi-9, MAR-M-509B, and combinations thereof.

12. The method of claim 10, wherein sintering the slurry includes a sintering temperature between about 1,100° C. to about 1,250° C.

13. The method of claim 10, wherein sintering the slurry includes a sintering duration between about 10 minutes to about 40 minutes.

14. The method of claim 10, wherein disposing the core in the die includes passing the core through the die.

15. The method of claim 10, wherein introducing the slurry into the gap includes introducing the slurry under elevated pressure.

16. A method for welding a workpiece, comprising welding the workpiece with a hybrid article serving as a weld filler, the hybrid article including:
a core including a lateral surface and a core material, the core being a wire, and
a sintered coating disposed on and circumscribing the lateral surface, the sintered coating including:
a first metallic particulate material including a first melting point and constituting, by weight, more than about 96% up to about 99.5% of the sintered coating; and
a second metallic particulate material including a second melting point and constituting, by weight, from about 0.5% up to 4% of the sintered coating,
wherein:
the second melting point is lower than the first melting point; and
the sintered coating includes a coating density less than the core.

17. The method of claim 16, wherein welding the workpiece includes inserting the hybrid article into an aperture of the workpiece and closing the aperture.

18. The method of claim 16, wherein welding the workpiece includes cosmetic buildup repair.

19. The method of claim 16, wherein the workpiece includes a hard-to-weld (HTW) alloy.

20. The method of claim 16, wherein welding the workpiece with the hybrid article serving as the weld filler includes employing a welding technique selected from the group consisting of at least one of fusion welding, gas tungsten arc welding, plasma arc welding, laser beam welding, and electron beam welding.

21. The hybrid article of claim 1, wherein the sintered coating consists of:
the first metallic particulate material selected from the group consisting of steel alloys, stainless steel alloys, superalloys, nickel-based superalloys, cobalt-based superalloys, iron-based superalloys, hard-to-weld (HTW) alloys, refractory alloys, GTD 111, GTD 222, GTD 262, HASTELLOY W, HAYNES 188, HANES 230, HANES 282, INCONEL 617, INCONEL 625, INCONEL 718, INCONEL 738, MAR-M-247, NIMONIC 263, Rene 41, Rene 80, Rene 108, Rene 142, Rene 195, 316SS, and combinations thereof; and
the second metallic particulate material selected from the group consisting of braze alloys BCo-1, DF-4B, BNi-2, BNi-5, BNi-9, MAR-M-509B, and combinations thereof.

* * * * *